July 30, 1940.　　　　H. C. McNALLY　　　　2,209,415
GEAR SELECTING MECHANISM
Filed June 19, 1937　　　2 Sheets-Sheet 1

INVENTOR
Henry C. McNally.
BY
ATTORNEY

July 30, 1940.  H. C. McNALLY  2,209,415
GEAR SELECTING MECHANISM
Filed June 19, 1937  2 Sheets-Sheet 2
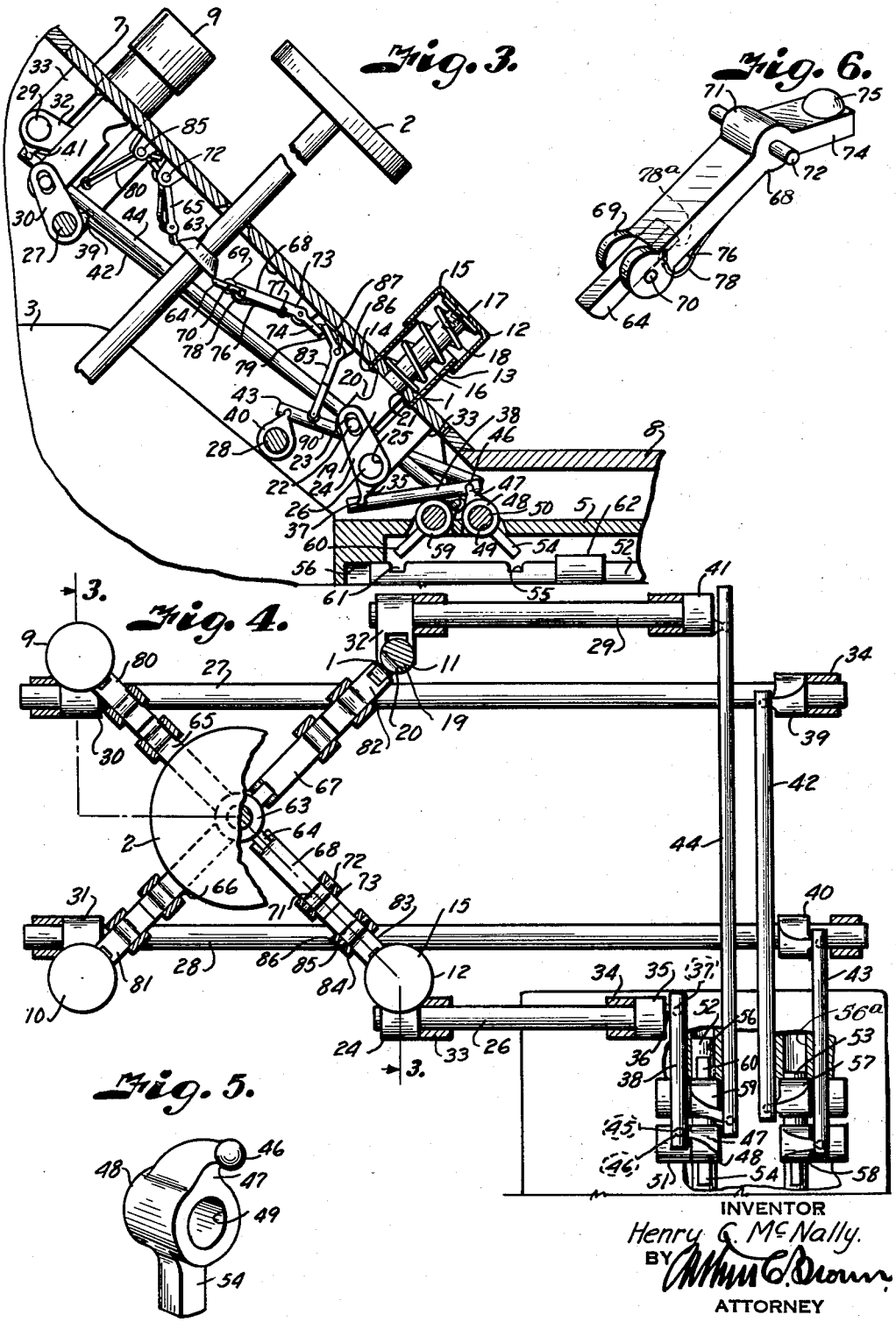
INVENTOR
Henry C. McNally.
BY
ATTORNEY Patented July 30, 1940

2,209,415

UNITED STATES PATENT OFFICE 2,209,415

GEAR SELECTING MECHANISM

Henry C. McNally, Omaha, Nebr.

Application June 19, 1937, Serial No. 149,163

23 Claims. (Cl. 74—474)

This invention relates to gear selecting mechanisms, and more particularly to a gear selecting mechanism adapted for use in a motor vehicle, whereby the power transmission gears of the vehicle may be selectively applied to the drive shaft thereof for propelling the vehicle.

The principal object of the present invention is to provide a mechanical gear selecting mechanism, wherein the usual hand lever mounted in the floor board in the center of the front seat of the vehicle may be dispensed with to provide more room therein for occupants of the vehicle.

Further objects of the present invention are to provide a gear selecting mechanism positioned about the usual clutch pedal and adapted for actuation by the foot of the vehicle operator in conjunction with actuation of the clutch pedal; to provide a mechanism of this character which is positive in action and easily operated; and to provide novel devices operably connecting the clutch pedal with the transmission gears, and gear selecting devices which tend to simplify the operation of a motor vehicle.

In accomplishing these and other objects of the present invention, I have provided improved details of structure, the preferred form of which is illustrated in the accompanying drawings, wherein:

Fig. 3 is a cross-section through the gear selecting mechanism on the line 3—3, Fig. 4, illustrating the clutch pedal in depressed lever actuating position.

Fig. 4 is a plan view of the apparatus, parts thereof being shown in horizontal cross-section to better illustrate the position thereof relative to the vehicle.

Fig. 5 is a detail perspective view of a transmission bar levering device embodying a feature of the present invention.

Fig. 6 is a detail perspective view of a clutch pedal actuated lever embodying a feature of the present invention.

Figure 1:
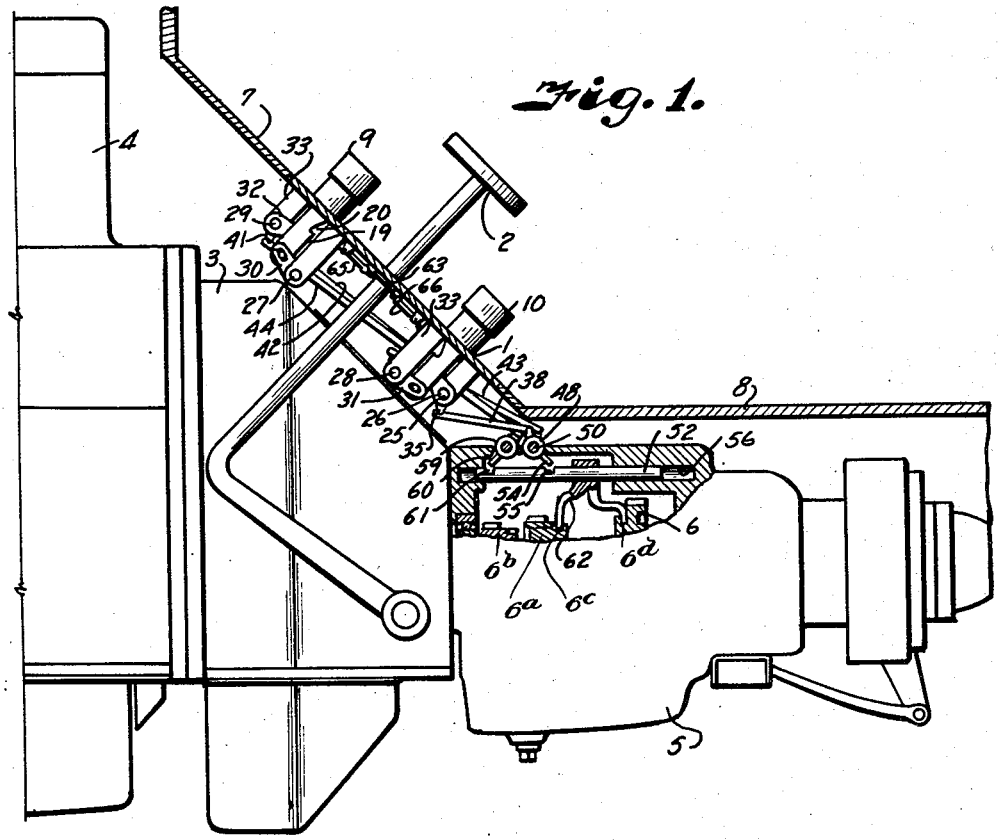
Fig. 1 is a side elevational view of a motor vehicle clutch housing and gear transmission, showing the application of a gear selecting mechanism embodying the features of the present invention to the transmission for selecting the gears thereof.

Referring more in detail to the drawings:

The invention generally consists of a gear selecting mechanism 1, which is affected by a clutch pedal 2 mounted in the usual manner on the clutch housing 3 of a motor vehicle having a conventional motor 4 and the customary transmission housing 5 which carries a conventional sliding gear 6, a clutch hub 6a, and a driving gear 6b, the sliding gear and clutch hub being operatively engaged with a shifting fork 6c in a suitable manner as indicated by the reference characters 6c and 6d.

The clutch pedal 2 extends above a suitable preferably upwardly inclined foot support 7 connected with the floor board 8 in the front seat position of the motor vehicle in a suitable manner substantially intermediately of foot depressible gear selecting devices 9, 10, 11 and 12, which are spaced from the clutch pedal shaft in angular relation thereto, a distance which renders them respectively engageable by the same foot of the operator which operates the clutch pedal, the gear selecting devices 9 to 12, inclusive, being mounted on the support 7 in positions relative to the clutch pedal similar to the positions ordinarily involved in a conventional hand operated gear shifting lever when shifting the transmission gears to reverse, low, second and high, in standard gear shifting practice.

Figure 2:
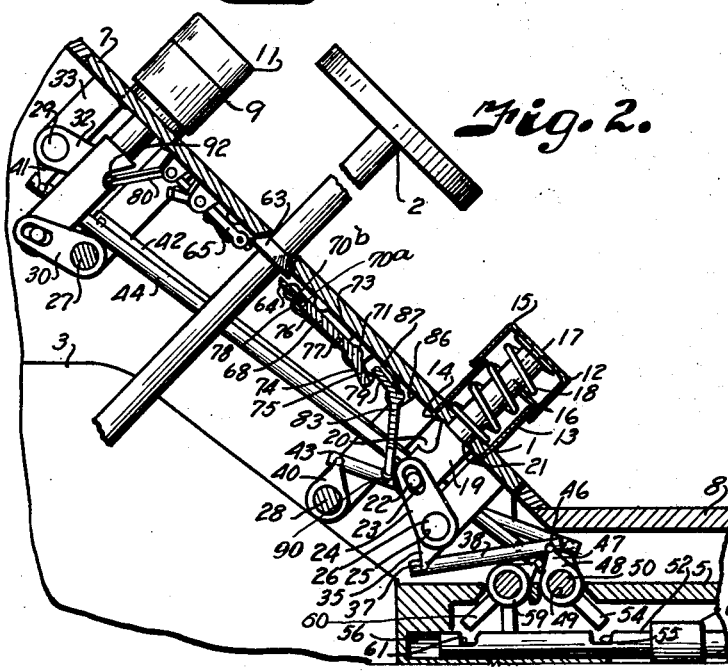
Fig. 2 is a detail elevational cross-section showing the motor vehicle reversing gear selector in depressed position.

The foot depressible gear selecting devices 9 to 12, inclusive, are each substantially similar in construction and operation and, the device 12 for example, Figs. 2 and 3, which in the present instance represents the selector for high gear, preferably consists of a substantially cylindrical sleeve 13 having its lower end suitably fixed to the support 7 as by the inwardly turned flanges 14 thereon and the sleeve 13 is provided with a telescoping cap member 15 mounted on the upper end thereof.

A pin or the like 16 is suitably mounted on the upper interior face of the cap member 15, as shown at 17, the pin extending downwardly therefrom through an opening in the support 7. A coil spring 18 is sleeved on the pin and has one end bearing on the cap member 15 and its other end bears on the upper face of the support 7 for normally maintaining the pin 16 and cap member 15 in raised position relative to the support 7 and sleeve 13.

Mounted on the lower end of the pin 16 is a lug 19 having a recess 20 at the upper inner end thereof relative to its connection 21 on the pin 16. The lug 19 extends downwardly relative to the support 7 and is provided at its lower end with a transverse pin 22 the ends of which are engaged in aligned slots, Fig. 2, in the spaced arms 23 extending laterally from one side of a link member 24 for transforming the straight motion of the pin 16 to substantially a circular motion, the link member having a bore 25 therein, Figs. 2 and 3, for receiving one end of a connecting shaft 26 for the device 12 in spaced relation to the pin 22. The shaft 26 extends laterally from the link member and preferably to the right, as shown in Fig. 4, and substantially similar shafts 27, 28 and 29 are also provided for, and adapted to be actuated by, the gear selecting devices 9, 10 and 11, respectively, the difference in the shafts being only as to their length whereby the outer end of each shaft may extend to proper non-interfering position relative to and adjacent the transmission housing 5.

Link members 30, 31 and 32 are also provided on the pins 16 of the gear selecting devices 9 to 11 which are similar in construction to the link member 24 on the pin 16 of the device 12. They are, however, adapted to be moved in different directions. To illustrate, it will be noted that the link 24 is so mounted between the shaft 26 and the device 12 as to be movable by the pin 16 in response to depression of the device 12 in an anti-clockwise direction inwardly relative to the group of gear selecting devices. The link 30 is connected with the device 9 and is arranged to be moved outwardly and in an anti-clockwise direction; the link 31 for the device 10 is adapted to move outwardly but in a clockwise direction; and the remaining link 32 on the device 11 is adapted for movement inwardly and in a clockwise direction.

The shaft 26, like the shafts 27, 28 and 29 has suitable bearing support 33 on the motor vehicle and extends laterally relative to the pin 16 for engagement in a suitable bearing 34 spaced from the bearing 33 which adapts the shaft 26 to have the movement of the link 24 imparted thereto and in the same directions. Mounted on the end of the shaft 26 opposite the link member 24 is a rod moving member 35 having a suitable bore by which said member may be sleeved on the shaft 26 and having a lug 36 extending from one side thereof which terminates in a ball 37 engageable in a socket at one side and substantially at one end of the connecting rod 38, as shown in Fig. 4. The outer ends of the shafts 27, 28 and 29 are respectively provided with rod moving members 39, 40 and 41, similar in construction to the member 35 and similarly adapted for engagement with the connecting rods 42, 43 and 44 respectively, which rods, like the shafts 26 to 29 are of different lengths which adapts them for suitable extension over the transmission housing to cooperate with the shafts 26 to 29 in rendering the transmission gears accessible to the operator of a vehicle or the like in which the gear selecting mechanism is mounted. The connecting rod 38, for example, extends rearwardly from the shaft 26 toward the transmission housing 5 below the support 7 and is provided with a socket 45 at its end and side opposite the ball and socket connection 37 which adapts it for ball and socket engagement with the ball end 46 on a laterally extending lug 47 of one of a plurality of transmission bar actuating members 48, one of which is particularly shown in Fig. 5.

The member 48 is provided with a body member having a bore 49 for pivotally sleeving the same on the pin 50 of a bearing member 51, Figs. 3 and 4, which bearing member is preferably fixed to the transmission housing 5 adjacent and above the transmission bars or gear shifting rails 52 and 53 in the transmission housing.

Mounted on the end of the member 48 opposite the ball 46 is a lug 54 which is adapted to be engaged in the notch 55 of the transmission bar 52, the transmission bar 52 being slidable in the way 56 of the transmission housing, as shown in Figs. 1 and 4. Members 57, 58 and 59, similar to the member 48 are provided on the ends of the rods 42, 43 and 44, respectively, said members being provided with lugs similar to the lug 54, which lugs are engageable in the respective notches of the transmission bars 52 and 53. For example, the lug 60 on the member 59 of the rod 44 is engageable in the notch 61 of the transmission bar 52 in forwardly spaced relation to the notch 55 therein, and the lugs of the members 57 and 58 for the rods 42 and 43 are engageable in the spaced notches of the transmission bar 53 to reciprocate the bar in its way 56a, Fig. 4.

With the construction thus far described, it is apparent that depression of the cap 15, for example, of the selecting device 12 pivots the link 24 on its shaft 26 to force the rod 38 rearwardly for pivoting the member 48 and forcing the lug 54 thereof into the rear notch 55 of the transmission bar 52 for moving the same in its way 56. The fingered shifting fork 62, Fig. 1, is suitably mounted on the gear shifting rails 52 and 53 and is adapted, in response to movement of the rails, to shift the conventional clutch elements of the transmission in such a manner as to coact with other conventional clutch elements on the vehicle drive shaft for direct drive, or with conventional cluch elements on the customary second speed gear for second speed drive. The gear 6, when moved by the shifting fork 62, acts to engage low or reverse gear ratios depending upon which direction the gear 6 is shifted.

It is apparent that the lugged members 57, 58 and 59 are mounted on their bearing pins in positions relative to each other substantially the same as the relative positions of the connecting rod moving members 39, 40 and 41, in such a manner that, while the operation is substantially the same for each gear, the lugs are engageable with the respective notches of the transmission bars to selectively reciprocate the bars, whereby the desired gears may be brought into play to propel the vehicle.

In order to provide for changing the gears at the will of the operator, I provide the shaft for the clutch pedal 2 with a beveled ring member 63, Figs. 2 and 3, the upper beveled edge thereof being engageable in a matingly beveled recess on the under face of the support opening for the clutch pedal. The under face of the ring 63 is engageable with lugs 64 on one of the ends of the neutralizing members 65, 66, 67 and 68, said members being of substantially the same construction, and one of them being particularly shown in Fig. 6.

The member 68, for example, Fig. 6, is provided with enlarged preferably circularly shaped bosses 69 at opposite sides of the inner end of the lug 64 and with a pivot pin 70 extending through the bosses and lug for pivotally mounting the lug 64 on the member 68, the lug 64 being limited in its pivotal movement in a counter-clockwise direction by engagement of the inner end thereof in a recess 70a in the member 68 adjacent the bosses 69 and against the underface of the shelf 70b bounding the top of the recess 70a. The member 68 is also provided with an enlarged bearing boss 71 at its other end for receiving a pivot pin 72 which is suitably mounted therein, the ends of which pin are adapted to be mounted in brackets 73, Fig. 3, suitably fixed to the under face of the support 7. An angularly extending lug 74 is mounted on the member 68 adjacent the bearing boss 71 and is provided with a cushioning member 75 on its upper face for engagement with a lever member presently to be described in detail. A spring 76 is mounted on the under face of the member 68 in a suitable manner, as shown at 77, Fig. 2, and has an inwardly curved end 78 engageable with the rear under face 78a, Fig. 6, of the pivoted lug 64 for normally maintaining the lug in substantially parallel relation to the body of the member 68 and for resiliently permitting pivotal movement of the lug 64 in a clockwise direction.

Figure 7:
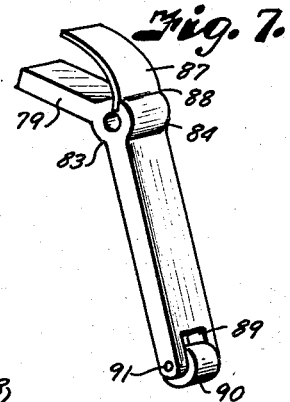
Fig. 7 is a detail perspective view of a latching device embodying a feature of the present invention.

As the pedal 2 is depressed, the ring 63 engages the lug 64 for pivoting the member 68 into cushioned engagement with an angularly extending lug 79, Fig. 3, mounted on each of a series of lever members 80, 81, 82 and 83, one of which was previously referred to. One of the members, for example the lever member 83 on the high gear selecting device, is particularly shown in Fig. 7 and has an enlarged bored bearing boss 84 adapted to receive a pivot pin 85, Fig. 4, the ends of which are engageable in the brackets 86 depending from the under face of the support 7 for pivotally mounting the member 80 on the under face of the support in spaced relation to the clutch pedal 2 and to position the lug 79 in over-lying relation to the cushioned lug 74 of the member 68. A spring 87 having one end mounted, as at 88, Fig. 7, in the bearing boss 84 of the member 80 is adapted to be bent forwardly over the lug 79 for cushioningly rendering the lug 79 engageable with the lug 74 and for normally tending to pivot the lower yoked end 89 of the member 80 upwardly or in a counterclockwise direction, as viewed in Figs. 2 and 3, the normal movement of the lever member 81, due to action of its spring 87, being counterclockwise, and the normal movement of the lever members 80 and 82, due to the action of their springs 87, being clockwise. A roller 90 is mounted on a pivot pin 91 between the yoked arms of the end 89 of the member 83, which roller is adapted to engage and ride over the inner recessed faces of the lugs 19 on the foot depressible selectors for engagement within the recesses 20 thereof, as shown at 92, Fig. 2, for maintaining the lugs 74 in depressed condition until the rollers are removed from the recesses by actuation of the clutch pedal 2, the clutch pedal thus affecting operation of the selectors whereby the gears 6 and 6a are selectively engaged or disengaged from driving relation to the vehicle drive shaft by the shifting fork 62 in response to actuation of the gear shifting rails 52 and 53 by the gear selecting mechanism.

The operation of a gear selecting mechanism constructed as described is as follows:

When clutch pedal 2 is depressed, the first member actuation is caused when beveled ring member 63 attached to the clutch pedal shaft contacts the lug 64 on each of the neutralizing members 65 to 68. There is a part of each of lugs 64 on the side opposite the clutch pedal shaft (from pin 70) which extends a short distance back from the pivot pin 70 under neutralizing member 68, for example, which would freely swing downward if it were not for the pressure of spring 78 holding lug 64 in its normal position in line with the body of member 68. Upon contact by beveled ring member 63 with lug 64, the part of the lug in the recess of member 68 holds lug 64 to the normal position, thus moving both lug 64 and member 68 downward in line together upon pivot pin 72. Cushioning member 75 then is pushed upward against tension of the spring 87 on extending lug 79, which is a part of lever member 83, and causes latter member 83 to pivot on its pivot pin 85 to swing downward and away from lug 19 the lower yoked end 89 on which pivot pin 91 is mounted to hold roller 90 in its place between the yoked arms. It is obvious that the manual (leg) strength of the average operator is stronger than the resistance offered by spring 87; therefore, as an illustration, the movement of lever members 68 and 83 in pulling roller 90 out of recess 20 releases the tension of coil spring 18 of the telescopic gear selector 12 and causes the disengagement of high or whatever other gear had previously been engaged. However, if no gear were engaged at the time the clutch pedal 2 is actuated, the lever members 68 and 83 are actuated as described above but since the recess 20 of lug 19 is normally (when that particular gear remains disengaged) out of reach of roller 90 of lever member 83, the roller is only moved in the customary arc from the bottom of lug 19 to about 45 degrees toward the clutch pedal shaft and returns again to remain pressed against lug 19 adjoined to pin 16 ready to drop or swing into recess 20 of lug 19 if that particular gear is subsequently selected.

The gears being neutralized, any gear, for example, that of high ratio, may be selected which is accomplished by actuation of the gear selector 12.

Upon depressing cap member 15 (of gear selector 12 in Fig. 3), spring 18 is compressed, against support 7, with pin 16 being partly extended through the opening in said support, and moving the adjoining lug 19 downward at an angle perpendicular to support 7 until roller 90, mounted on a pivot pin 91 between the yoked arms of end 89 of the member 83, which is continually contacting, by pressure of spring 87, the interior side (facing clutch pedal shaft) of lug 19 contacts and becomes engaged in the recess 20 in a manner similar to that shown in Fig. 2 for the roller for the gear selector 11. Lever member 83, under pressure of spring 18 retains the cap member 15 and other connecting members in the above described position until the operator desires to again put the gears in neutral prior to either shifting to another gear or stopping. The clutch pedal is then sufficiently depressed to cause ring 63 to engage lugs 64 which move members 68 and 83 on pivots 72 and 85 respectively in pulling (by leverage) roller 90 of member 83 out of the recess 20, thus releasing through pressure of spring 18 the lug 19 and adjoining pin 16 connected to depressing member 15 and forcing these members, as well as the yoke and lever members, shafts, rods, lugs, etc., to assume the released or neutral position. From the action of lug 19 as stated above, and continuing with the mechanism connected to the gears, the short pin 22 extending parallel to shaft 26 is engaged in the slotted arms 23 of the link member 24 which link member transforms the vertical to circular motion, through connection to shaft 26 by means of the bore in the end of member 24. Upon actuation of lug 19 as described in detail above, shaft 26, mounted in bearing supports 33 and 34 is turned anti-clockwise, Fig. 3, which shaft 26, being connected on the other end from member 24 to rod moving member 35 (for transforming the circular motion to substantially horizontal motion) and having the bore by which the shaft 26 may be attached and the lug 36 extending from one side thereof which terminates in the ball 37 engageable in the ball socket at one end of the connecting rod 38, as shown in Fig. 4, moves rod 38 backwardly toward the transmission housing 5 below support 7. The rod 38 is provided at its other end with the socket connection which adapts it for ball and socket engagement with the ball end 46 on the lug 47 of the gear shifting rail actuating member 48, (particularly shown in Fig. 5), for moving member 48, which has the bore 49 for attachment to pin 50 of bearing member 51, in a clockwise direction, Fig. 3, causing lug 54, mounted on member 48 opposite ball 46, to engage in notch 55 of gear shifting rail 52 slidable in way 56 and move forward said gear shifting rail which, being connected to the shifting fork 62 completes the shifting by moving forward the front idler gear 6a into mesh with the front driving gear 6b just in rear of the front wall of transmission housing 5.

The clutch pedal, in returning to the normal driving position (by release of operator's foot pressure), and having ridden past the lugs 64, causes beveled ring member 63 attached to the clutch pedal shaft to actuate upwardly the four lugs 64 on the ends of the neutralizing members 65, 66, 67, and 68 without causing any further movement of the mechanism other than the slight bending of springs 76, which springs return lugs 64 to their normal position in line with their respective neutralizing members which are actuated only on the downward movement of the clutch pedal, at which time lugs 64 remain in line with and operate as a part of the neutralizing members, as for example when other gears are selected.

The principal advantages in a gear selecting mechanism embodying the features of the present invention are that it obviates the necessity for the usual gear shifting lever, the omission of which provides greater leg room and comfort in the interior of the motor vehicle for occupants thereof. Further, the operator is permitted to select gears of the vehicle with the same foot with which he actuates the clutch pedal and he is, therefore, permitted to at all times use both hands for driving the vehicle in which the present invention is installed even during the gear selecting and shifting operation, thereby enhancing maximum safety for the driver and occupants of the vehicle.

What I claim and desire to secure by Letters Patent is:

1. In an apparatus of the character described comprising a transmission having gears and gear shifting rails, a support, a gear selector mounted on said support having a link, a shaft connected with said link, means pivotally mounted relative to said shaft and operable in response to actuation of said selector and adapted to engage said gear shifting rails for moving the same, and a non-tiltable, non-slidable single unit faced solid construction clutch member operating pedal mounted on said support and engageable with said selector to allow disengagement thereof relative to said gears.

2. A gear selecting mechanism of the character described including in combination with a transmission having gears and gear shifting rails, a support, a sleeve mounted on the support, a cap telescopingly mounted on said sleeve, a pin mounted on said cap and reciprocable within said sleeve, a lug on said pin having a recess, a link pivotally mounted on said lug, a shaft mounted on said link, a rod having ball and socket connection with said shaft, a member mounted on said rod opposite said ball and socket connection, and a lug on said member engageable with a gear shifting rail for moving said rail upon depression of said cap.

3. A gear selecting mechanism of the character described including in combination with a transmission having gears and gear shifting rails, a support, telescoping means mounted on said support, means on said telescoping means engageable with a gear shifting rail for moving said rail upon actuation of said telescoping means, a clutch operating member mounted in said support, means pivotally mounted on the support adapted to be engaged by said clutch operating member upon actuation of said member, said pivotal means being engageable with said telescoping means for effecting disengagement of said rail engageable means from the rail in response to actuation of the clutch operating member.

4. A gear selecting mechanism of the character described including in combination with a transmission having gears and gear shifting rails, a support, telescoping means mounted on the support, link means pivotally mounted on said telescoping means, means on said link means engageable with a gear shifting rail for moving the rail upon actuation of said telescoping means, a clutch operating member mounted in said support, and a lever member pivotally mounted on the support adapted to engage said telescoping means and clutch operating member upon actuation of said clutch operating member for disengaging said rail engageable means from the rail upon actuation of the clutch operating member.

5. In combination with a gear selecting mechanism of the character described having gear selectors respectively engageable with transmission means for selecting the gears thereof, a clutch member, and a non-tiltable, non-slidable single unit faced conventional type clutch member operating pedal, a support, and a plurality of independently operable selectors adapted to respectively select all gears of the transmission suitably and uniformly secured individually on top of the support and spaced approximately equidistantly around and below the clutch pedal a distance sufficient to permit clutch pedal and gear selector actuation by the same foot of an operator, said gear selectors each comprising a combination sleeved member arranged below the support and engageable with portions of said transmission means and including a body having a laterally extending ball at one end and a laterally extending lug at its other end, the clutch operating pedal being adapted to allow disengagement of the transmission portion engageable means in response to actuation of said clutch operating pedal.

6. A gear selecting mechanism of the character described including in combination with a transmission having gears and gear shifting rails, a support, a sleeve mounted on the support, a cap member telescopingly mounted on said sleeve, a pin mounted on said cap member and reciprocable within said sleeve, a lug on said pin having a recess, a link pivotally mounted on said lug, a shaft mounted on said link, a rod having connection with said shaft, a sleeve mounted on said shaft, means on said sleeve engageable with a gear shifting rail, a clutch operating member mounted in said support having a ring thereon, a lever member pivotally mounted on the support adapted to be engaged by said ring upon depression of said clutch operating member, a lever member pivotally mounted on said support having an end engageable by an end of the first named lever member, and means on an end of said last named lever member engageable in the recess of the recessed lug and adapted to be removed from engagement therewith upon actuation of said clutch operating member for permitting release of engagement between the gear shifting rail and the rail engageable means on the sleeve.

7. In combination with a motor, a transmission having gears, and a combination clutch operating and gear disengaging member, a gear selecting mechanism of the character described having gear selectors for selecting the gears of the transmission, said gear selectors each comprising a lever member including a body member having a pivotal lug thereon engageable by the clutch operating member, and an angularly extending lug opposite said first-named lug connectible with portions of the transmission means to select a gear thereof.

8. In combination with a motor, a transmission having gears, a combination clutch operating and gear disengaging member, a support, and a gear selecting mechanism of the character described having gear selectors respectively engageable with the transmission for selecting the gears thereof, said gear selectors comprising a lever member including a body member having a pivotal lug thereon engageable by the clutch operating member and an angularly extending lug opposite said first-named lug having a cushion on one face thereof engageable with the support to cushion the action of the selectors.

9. In combination with a gear selecting mechanism of the character described having gear selectors respectively engageable with transmission means for selecting the gears thereof; a lever member including a body member having an angularly extending lug, a spring mounted in the body member over said lug, and a roller in the body member opposite said lug.

10. In combination with a motor, a clutch member, a transmission, and a non-tiltable, non-slidable single unit faced solid construction combination clutch operating and gear disengaging member, a support, and a plurality of independently operable selectors adapted to respectively select all the gears of the transmission including reverse gear suitably and uniformly secured individually on the support below and spaced from and around the clutch operating member a distance sufficient for engagement by the same foot of an operator actuating a clutch member operating pedal, the clutch operating member being adapted to disengage the gear engaging selectors in response to actuation of said combination clutch operating and gear disengaging member, actuation of the combination clutch operating and gear disengaging member being independent relative to the selectors.

11. A gear selecting mechanism of the character described including in combination with a motor and a transmission having gears, a combination clutch operating and gear disengagement actuating member, and a plurality of selective foot operated elements adapted to be actuated independently of the combination clutch operating and gear disengagement actuating member for causing selection of gears in the transmission and adapted to be disengaged from said gear selecting relation to said gears upon actuation of said gear disengagement member.

12. In combination with a motor, a transmission having gears and a gear disengaging member, a support, a selective foot operated gear selector adapted to be actuated independently of the gear disengaging member mounted on the support for selecting and actuating the gears of the transmission, means for selectively connecting a gear of the transmission with said gear selector, and means for disengaging the selector from said gear in response to actuation of the gear disengaging member.

13. In combination with a motor, a transmission having gears and a combination clutch operating and gear disengaging member, a support, a selective gear selector adapted to be actuated independently of the combination clutch operating and gear disengaging member mounted on the support for selecting and actuating the gears of the transmission, means for selectively connecting a gear of the transmission with said gear selector, and means for disengaging the selector from said gear in response to actuation of the combination clutch operating and gear disengaging member.

14. An apparatus of the character described including in combination with a motor, a transmission having gears and gear shifting rails, and a support; a resiliently depressible member mounted on the support, a link connected with said depressible member, a shaft connected with said link, means connected with the shaft engageable with the gear shifting rails for acting on said gears in response to depression of said depressible member, and a clutch operating member adapted to disengage the rail engageable means in response to actuation of said clutch operating member.

15. An apparatus of the character described including in combination with a motor, a transmission having gears, and a support, a plurality of independently operable resiliently depressible members mounted individually on the support, means for connecting the individually mounted resiliently depressible members with gears of the transmission respectively, means for actuating said gears in response to the depression of said resiliently depressible members, means for disengaging said resiliently depressible members from said gear actuating means in response to the actuation of a foot operated gear neutralizing member, and a foot operated gear neutralizing member.

16. A gear selecting mechanism of the character described including in combination with a transmission having gears and gear shifting rails, a support, and a clutch operating member on the support; a sleeve mounted on the support, a cap telescopingly mounted on said sleeve, a pin mounted on said cap and reciprocable within said sleeve, a lug on said pin, a link pivotally mounted on said lug, a shaft mounted on said link, a rod connected to said shaft, a member mounted on said rod opposite the connection of the rod to the shaft, and a lug on said member engageable with a gear shifting rail for moving said rail upon depression of said cap, the clutch operating member being adapted to effect disengagement of the rail engageable lug from the rail upon actuation of the clutch operating member.

17. A gear selecting mechanism of the character described including in combination with a transmission having gears and gear shifting rails, a support, resiliently depressible means mounted on said support, means on said depressible means engageable with a gear shifting rail for moving said rail upon actuation of said depressible means, a clutch operating member mounted on said support, and means pivotally mounted on the support adapted to be engaged by said clutch operating member upon actuation of said member, said pivotal means being engageable with said depressible means for effecting disengagement of said rail engageable means from the rail in response to actuation of the clutch operating member.

18. A gear selecting mechanism of the character described including in combination with a transmission having gears and gear shifing rails, a support, a sleeve mounted on the support, a cap member telescopingly mounted on said sleeve, a pin mounted on said cap member and resiliently reciprocable within said sleeve, a lug on said pin having a recess, a link pivotally mounted on said lug, a shaft mounted on said link, a rod having connection with said shaft, a sleeve mounted on said shaft, means on said sleeve engageable with a gear shifting rail, a clutch operating member mounted on said support having a ring thereon, a lever member pivotally mounted on the support, a lug pivotally and resiliently mounted on the lever member adapted to be engaged by said ring upon depression of said clutch operating member, a lever member pivotally mounted on said support having an end engageable by the end of the first named lever member opposite the lug, means on one of said lever members resiliently urging the other of said lever members into contact therewith, means on one of said lever members for cushioning contact between said lever members, and a roller on the end of said second named lever member opposite contact with the first named lever engageable in the recess of the recessed lug and adapted to be removed from engagement therewith upon actuation of said clutch operating member for effecting release of engagement between the gear shifting rail and the rail engageable means on the sleeve.

19. In combination with a gear selecting mechanism of the character described including gear selectors respectively engageable with transmission means for selecting the gears thereof; a lever member including a body member having a pivotal lug thereon, a spring in the body member normally maintaining the lug in alignment with the body member, and an angularly extending lug opposite said first named lug having a cushion on one face thereof.

20. In combination with a motor, a transmission having gears, a support, a foot operated gear disengaging member arranged adjacent the support, and a gear selecting and shifting mechanism of the character described including foot operated gear selectors respectively engageable with portions of the transmission for selecting the gears therof, said gear selectors each comprising a lever member including a body member having an angularly extending lug, and a spring mounted in the body member over said lug and engageable with the support to normally operatively position said gear selectors relative to said foot operated gear disengaging member.

21. In an apparatus of the character described comprising a transmission having gears, a sup-, port, a gear selector mounted on said support having a link, a shaft connected with said link, means pivotally mounted relative to said shaft and operable in response to actuation of said selector and adapted to engage said gears for moving the same, and a foot operated gear disengaging pedal member engageable with said selector to allow disengagement thereof relative to said gears.

22. In combination with a gear selecting mechanism of the character described having a plurality of foot actuated gear selectors respectively engageable with transmission means for selecting and actuating all forward and reverse gears thereof, said gear selectors each comprising a combination sleeved member including a body having a laterally extending ball at one end and a laterally extending lug at its other end engageable with portions of the transmission means to effect selection of gears thereof, and a foot operated member adapted to disengage all gears of the transmission means simultaneously to neutralize said gears.

23. In an apparatus of the character described, the combination of a foot operated gear disengaging member with a gear selecting mechanism of the character described having gear selectors respectively engageable with transmission means for selecting the gears thereof, the gear selecting mechanism comprising a lever member including a body member having a pivotal lug thereon engageable by the foot operated gear disengaging member, and an angularly extending lug opposite said first-named lug connectible with portions of the transmission means to select a gear thereof.

HENRY C. McNALLY.